(12) United States Patent
Kunz et al.

(10) Patent No.: US 10,289,533 B2
(45) Date of Patent: May 14, 2019

(54) MANAGING EXTRACTION OF DATA FOR TESTING

(71) Applicant: SAP SE, Walldorf (DE)

(72) Inventors: Matheus Pergher Kunz, Porto Alegre (BR); Felipe Rabuske Costa, São Leopoldo (BR); Mateus Manica, Novo Hamburgo (BR); Marcelo Horst Rescigno, Porto Alegre (BR); Guilherme Ziegler De Santis, Porto Alegre (BR); Matheus Pinto Soares, Porto Alegre (BR); Douglas Neves Spindler, Novo Hamburgo (BR); Eduardo Engel Balle, Cachoeirinha (BR); Richard Rambor, Novo Hamburgo (BR); Jonas Johann, Dois Irmãos (BR); Boris Filipe Klug da Cruz, Estancia Velha (BR); Pedro Ivo Strepeckes Affonso Costa, São Leopoldo (BR); Omar Eduardo Granados Mateus, Porto Alegre (BR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/691,174

(22) Filed: Aug. 30, 2017

(65) Prior Publication Data

US 2019/0065350 A1    Feb. 28, 2019

(51) Int. Cl.
*G06F 11/36* (2006.01)
*G06F 9/44* (2018.01)
(Continued)

(52) U.S. Cl.
CPC ...... *G06F 11/3684* (2013.01); *G06F 11/3688* (2013.01); *G06F 11/3692* (2013.01); *G06F 21/6254* (2013.01)

(58) Field of Classification Search
CPC ............ G06F 11/3495; G06F 11/1451; G06F 11/1464; G06F 11/3476; G06F 11/0709;
(Continued)

(56) References Cited

U.S. PATENT DOCUMENTS

| 8,881,105 | B2 * | 11/2014 | Quilter, Jr. | ......... | G06F 11/3672 |
| | | | | | 714/38.1 |
| 9,104,811 | B1 * | 8/2015 | Cohen | ...................... | G06F 8/30 |

(Continued)

OTHER PUBLICATIONS

Patel et al., Automated testing of software-as-a-service configurations using a variability language, 10 pages (Year: 2015).*

(Continued)

*Primary Examiner* — Thuy Dao
(74) *Attorney, Agent, or Firm* — Klarquist Sparkman, LLP

(57) ABSTRACT

At least one computing device generates a configuration file associated with a module of a software system for use in extracting data from the module in the software system according to a specification. The configuration file is provided to the customer system using a module identity. Extracted data is received from the customer system. Testing relating to the functionality of the customer system is performed on at least some of the received extracted data, and a result of the testing is associated with the customer system using the module identity.

20 Claims, 12 Drawing Sheets

(51) Int. Cl.
*G06F 9/45* (2006.01)
*G06F 21/62* (2013.01)

(58) Field of Classification Search
CPC ............... G06F 11/0778; G06F 11/073; G06F 11/3688; G06F 11/3664; G06F 11/3672; G06F 11/3668; G06F 11/3692; G06F 11/3684; G06F 21/6254; H04L 67/22; H04L 67/12; H04L 67/306
See application file for complete search history.

(56) References Cited

U.S. PATENT DOCUMENTS

| | | | | |
|---|---|---|---|---|
| 9,218,269 | B2 * | 12/2015 | Dolinina | G06F 11/3672 |
| 9,235,412 | B1 * | 1/2016 | Cohen | G06F 11/3684 |
| 9,405,667 | B1 * | 8/2016 | Dunn | G06F 11/36 |
| 9,529,704 | B2 * | 12/2016 | Waldon | G06F 11/3664 |
| 2004/0181713 | A1 * | 9/2004 | Lambert | G06F 11/3684 |
| | | | | 714/48 |
| 2007/0168991 | A1 * | 7/2007 | Greenberg | G06F 9/542 |
| | | | | 717/127 |
| 2007/0260932 | A1 * | 11/2007 | Prichard | G06F 11/2215 |
| | | | | 714/39 |
| 2008/0058961 | A1 * | 3/2008 | Biberdorf | G06F 11/0709 |
| | | | | 700/5 |
| 2011/0055637 | A1 * | 3/2011 | Clemm | H04L 41/0816 |
| | | | | 714/39 |
| 2012/0054675 | A1 * | 3/2012 | Rajamannar | G06F 11/0769 |
| | | | | 715/809 |
| 2014/0132571 | A1 | 5/2014 | Zeng et al. | |
| 2014/0359371 | A1 | 12/2014 | Schur et al. | |
| 2015/0095895 | A1 * | 4/2015 | Taneja | G06F 11/3684 |
| | | | | 717/132 |
| 2015/0293833 | A1 | 10/2015 | Kemmler et al. | |
| 2016/0299936 | A1 * | 10/2016 | Chavda | G06F 11/36 |
| 2016/0314302 | A1 | 10/2016 | Sabetta et al. | |
| 2016/0335058 | A1 | 11/2016 | Weckwerth et al. | |
| 2016/0335068 | A1 | 11/2016 | Wieczorek et al. | |
| 2016/0335069 | A1 | 11/2016 | Dehmann et al. | |
| 2016/0350209 | A1 | 12/2016 | Belyy et al. | |
| 2016/0358109 | A1 | 12/2016 | Kruempelmann et al. | |
| 2018/0039565 | A1 * | 2/2018 | Rajagopalan | G06F 11/3664 |

OTHER PUBLICATIONS

Holmes et al., Identifying program, test, and environmental changes that affect behaviour, 10 pages (Year: 2011).*

* cited by examiner

| Object | Description | Anonymize | Conditions |
|---|---|---|---|
| ☐ INFOTYPE PA0001 | | | |
| ☐ PAYROLL EVP | | | |
| ☐ PAYROLL VERSION | | | |
| ☐ PAYROLL VERSC | | | |
| ☐ PAYROLL WPBP | | | |
| ☐ PAYROLL ABC | | | |
| ☐ PAYROLL RT | | | |
| ☐ PAYROLL CRT | | | |
| ☐ PAYROLL BT | | | |
| ☐ PAYROLL CO | | | |
| ☑ APZNR | PC205 assignment | ☐ | |
| ☑ SEQNO | Sequential number | ☐ | |
| ☐ KBUNN | Company code | ☐ | |
| ☐ KGBNN | Business Area | ☐ | |
| ☑ KSTNN | Cost Center | ☑ | |
| ☑ KPRNN | Percentage rate for cost distr | ☐ | |
| ☐ FISTL | Funds Center | ☐ | |
| ☐ GEBER | Fund | ☐ | |
| ☑ AUFNN | Order Number | ☐ | |
| ☐ PSPNN | Work Breakdown Structure Eleme | ☐ | |
| ☐ FKBER | Functional Area | ☐ | |
| ☑ GRANT_NBR | Grant | ☐ | |
| ☐ SGMNT | Segment for Segmental Reprotin | ☐ | |
| ☐ BUDGET_PD | FM: Budget Period | ☐ | |
| ☐ PAYROLL C1 | | | |
| ☑ C12NR | Pointer to cost accounting | ☐ | |
| ☑ BUKRS | Company Code | ☐ | |
| ☑ GSBER | Business Area | ☐ | |
| ☑ KOKRS | Controlling Area | ☐ | |
| ☑ KOSTL | Cost Center | ☑ | |
| ☐ AUFNR | Order Number | ☐ | |
| ☑ KSTRG | Cost Object | ☐ | |
| ☐ POSNR | Work Breakdown Structure Element | ☐ | |
| ☐ NPLNR | Network Number for Account Ass | ☐ | |

```
<?xml version="1.0"?>
<asx:abap:xmlns:asx="http://www.sap.com/abapxml" version="1.0">
  <asx:values>
    <DATA>               ~502
      <MOLGA>38</MOLGA>
      <FUNCTIONALITY>MY PROGRAM</FUNCTIONALITY>   ~504
      <TDC>MYPROG</TDC>   ~506
508~  <PAYROLL>
        <TYPE_A>X</TYPE_A>
        <TYPE_O>X</TYPE_O>
        <TYPE_P>X</TYPE_P>
        <STRUCT>
          <Item>
            <TABLE>C0</TABLE>
            <DATA>
              <Item>
                <FIELDNAME>APZNR</FIELDNAME>
                <ROLLNAME>APZNR</ROLLNAME>
                <REQURIED>X</REQUIRED>
                <ANONYMIZE/>
                <DESCRIPTION>PC205 assignment</description>
                <SELECTION_CRITEREIA/>
              </item>
              <Item>
                <FIELDNAME>SEQNO</FIELDNAME>
                <ROLLNAME>SEQHX</ROLLNAME>
                <REQURIED>X</REQUIRED>
                <ANONYMIZE/>
                <DESCRIPTION>Sequential number</DESCRIPTION>
                <SELECTION_CRITEREIA/>
              </item>
              <Item>
                <FIELDNAME>KBUNN</FIELDNAME>
                <ROLLNAME>BUKRS</ROLLNAME>
                <REQURIED/>
                <ANONYMIZE/>
                <DESCRIPTION>Company Code</DESCRIPTION>
                <SELECTION_CRITEREIA/>
              </item>
              <Item>
                <FIELDNAME>KGBNN</FIELDNAME>
                <ROLLNAME>GSBER</ROLLNAME>
                <REQURIED/>
                <ANONYMIZE/>
                <DESCRIPTION>Business Area</DESCRIPTION>
                <SELECTION_CRITEREIA/>
              </item>
              <Item>
                <FIELDNAME>KSTNN</FIELDNAME>
                <ROLLNAME>KOSTL</ROLLNAME>
                <REQURIED/>X</REQUIRED>
```

FIG. 5

Test Data Extractor

↻ 🗃 🗏

| Further Selections ⇧ | Search Helps ⇧ | Sort Order |

Time Prd.

○ Today   ○ Current month   ○ Current year
○ Up to Today   ○ From today
⦿ Other Period Time Prd.  [01.01.2016] 🗓  To  [30.06.2016] ⎬—602

Selection

Personnel Number  [38480001]  ⎬—604

File Selection

Input Configuration File  608—[C:\Users\i813651\Desktop\Data Extractor 4TDC\Pila Sce...] ⎫
Output Data File  610—[C:\Users\i813651\Desktop\Data Extractor 4TDC\Pila Sce...] ⎬—606

| | | | |
|---|---|---|---|
| ◇ 🗗 🔳 🔳 □ ⧉ | | | |
| IMPORTANT INFORMATION!<br>Select ONLY the REQUIRED fields for your tests to keep the file size as small as possible<br>DO NOT forget to check ANONYMIZE option in all fields related to personal information | | | |
| Object (702) | Description (704) | Anonymize (706) | Conditions (708) |
| ▶ ☐ FEATURE 38RIE | | | |
| ▶ ☐ INFOTYPE PA0000 — 710 | | | |
| • 📄 ☐ AEDTM | Last Changed On | ☐ | |
| • 📄 ☑ BEDGA | Start Date | ☐ | |
| • 📄 ☑ ENDDA | End Date | ☐ | |
| • 📄 ☐ FLAG1 | Reserved Field/Unused F... | ☐ | |
| • 📄 ☐ FLAG2 — 712 | Reserved Field/Unused F... | ☐ | |
| • 📄 ☐ FLAG3 | Reserved Field/Unused F... | ☐ | |
| • 📄 ☐ FLAG4 | Reserved Field/Unused F... | ☐ | |
| • 📄 ☐ GRPVL | Grouping Value for Pers... | ☐ | |
| • 📄 ☐ HISTO | Historical Record Flag | ☐ | |
| • 📄 ☐ ITBLD | Infotype Screen Control | ☐ | |
| • 📄 ☐ ITXEX | Text Exists for Infotype | ☐ | |
| • 📄 ☑ MASSG | Client | ☐ | |
| • 📄 ☑ MASSIN | Reason For Action | ☐ | |
| • 📄 ☑ OBJPS | Action Type | ☐ | |
| • 📄 ☑ OBJPS | Object Identification | ☐ | |
| • 📄 ☐ ORDEX | Confirmation Fields Exist | ☐ | |
| • 📄 ☑ PERNR | Personal Number | ☐ | |
| • 📄 ☐ PREAS | Resin for Changing Ma... | ☐ | |
| • 📄 ☐ REFEX | Reference Fields Exist (P... | ☐ | |
| • 📄 ☐ RESE1 | Reserved Field/Unused F... | ☐ | |
| • 📄 ☐ RESE2 | Reserved Field/Unused F... | ☐ | |
| • 📄 ☑ SEQNR | Number of Infotype Rec... | ☐ | |
| • 📄 ☑ SPRPS | Lock Indicator for HR Ma... | ☐ | |
| • 📄 ☑ STAT1 | Customer Specific Status | ☐ | |
| • 📄 ☑ STAT1 | Employment Status | ☐ | |
| • 📄 ☑ STAT2 | Special Payment Status | ☐ | |
| • 📄 ☑ STAT3 | Subtype | ☐ | |
| • 📄 ☑ SUBTY | Name of person who ch... | ☐ | |
| • 📄 ☐ UNAME | | | |
| ▶ ☐ INFOTYPE PA0001 | | | |

```
Download XML

<?xml version="1.0" encoding="ISO-8859-1"?>
- <DATA>
    - <GENERIC>
          <FUNCTIONALITY>PILA</FUNCTIONALITY>
          <TDC>PILA</TDC>
          <MOLGA>38</MOLGA>
      </GENERIC>
    - <INFOTYPES>
          <item>
              <INFTY>0000</INFTY>  ~802
            - <DATA>
                - <TAR>
                    - <P0000>
                          <PERNR>38780001</PERNR>  ~804
                          <INFTY>0000</INFTY>
                          <SUBTY/>
                          <OBJPS/>
                          <SPRPS/>
                          <ENDDA>2016-05-03</ENDDA>
                          <BEGDA>2016-01-01</BEGDA>   }-806
                          <SEQNR>000</SEQNR>
                          <AEDTM/>
                          <UNAME/>
                          <HISTO/>
                          <REFEX/>
                          <ORDEX/>
                          <ITBLD/>
                          <PREAS/>
                          <FLAG1/>
                          <FLAG2/>
                          <FLAG3/>
                          <FLAG4/>
                          <RESE1/>
                          <RESE2/>
                          <GRPVL/>
                          <MASSN>01</MASSN>
                          <MASSG/>
                          <STAT1/>
                          <STAT2>3</STAT2>
                          <STAT3>1</STAT3>
                      </P0000>
                    - <P0000>
                          <PERNR>38480001</PERNR>
                          <INFTY>0000</INFTY>
                          <SUBTY/>
                          <OBJPS/>
                          <SPRPS/>
                          <ENDDA>2016-05-12</ENDDA>
                          <BEDGA>2016-05-04</BEGDA>
                          <SEQNR>000</SEQNR>
```

| Variant | Descr | IT_000 | IT_0001 | IT_0002 | IT_0008 | IT_0021 |
|---|---|---|---|---|---|---|
| 1 | 38480001 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 2 | 38480001 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 3 | 38480002 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 4 | 38480002 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 5 | 38480003 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 6 | 38480004 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 7 | 38480005 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 8 | 38480006 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 9 | 38480007 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 10 | 38480008 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 11 | 38480009 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 12 | 38480010 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 13 | 38480011 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 14 | 38480012 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 15 | 38480013 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 16 | 38480014 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 17 | 38480015 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 18 | 38480016 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 19 | 38480129 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 20 | 38480129 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 21 | 38480001 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 22 | 38480002 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 23 | 38480003 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 24 | 38480001 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 25 | 38480002 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 26 | 38480004 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 27 | 38480015 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |
| 28 | 38480015 | <?xml version="1.0"?>. | <?xml version="1.0"?>. | <?xml version="1.0"?>. | <?xml version="1.0"?><asx:abap... | <?xml version="1.0"?><asx:abap version="1.0" xmlns:asx="http://www.sap.com/abapxml"><a |

MANAGING EXTRACTION OF DATA FOR TESTING

TECHNICAL FIELD

This description relates to managing extraction of data from a computer system for performing testing on the extracted data.

BACKGROUND

Testing plays an important role in software development. Developers, product owners, project managers and/or quality engineers can put significant effort into such a task, for example by modelling, defining, creating and maintaining testing artefacts and activities. However, software that is delivered to customers may not always be prepared to handle certain unforeseen situations. One reason for this can be that those working on software development do not have access to real data on which to test developed software. Additional development may then be performed.

SUMMARY

In a first aspect, a computer program product is tangibly embodied on a non-transitory computer-readable storage medium and comprises instructions that, when executed, are configured to cause at least one computing device to generate a configuration file associated with a module of a software system, the configuration file generated for use in extracting data from the module in the software system according to a specification in the configuration file; determine a module identity associated with a customer system, the module identity determined based on a need to perform testing related to functionality of the customer system. The instructions can cause the computing device to provide the configuration file to the customer system using the module identity. The instructions can cause the computing device to receive extracted data from the customer system in response to providing the configuration file, the extracted data corresponding to the specification and having been extracted from the customer system using the configuration file. The instructions can cause the computing device to perform the testing relating to the functionality of the customer system, the testing performed on at least some of the received extracted data. The instructions can cause the computing device to associate a result of the testing with the customer system using the module identity.

Implementations can include any or all of the following features. The computer program product can further comprise instructions to cause at least one computing device to receive an incident report generated using the customer system. The incident report can indicate an incident relating to the functionality, and the module identity can be determined using the incident report. The computer program product can further comprise instructions to cause at least one computing device to identify a development system for performing the testing. The development system can be identified using at least the module identity, and can provide the received extracted data to the identified development system. The configuration file can be generated before receiving the incident report, and the configuration file can be provided to the customer system in response to receiving the incident report. Performing the testing can result in development of software for the software system, and the computer program product can further comprise instructions to cause at least one computing device to provide the developed software to the customer device in response to receiving the extracted data. The computer program product can further comprise instructions to cause at least one computing device to run a configuration generator tool comprising an interface that is designed to receive input. The configuration file can be generated based on the input, the interface can identify data objects for a user to select at least one data object identifier for inclusion in the configuration file, and the interface can include a control for causing the selected data object in the received extracted data to be anonymized before the testing is performed. The specification in the configuration file can identify categories of data objects to be extracted using the configuration file, and the computer program product can further comprise instructions to cause at least one computing device to organize and store the received extracted data according to the categories. Contents of the configuration file can be expressed using markup language. The extracted data can be received as a file, and contents of the file can be expressed using the markup language. The computer program product can further comprise instructions to cause at least one computing device to provide a data extraction tool to the customer system. The data extraction tool can comprise an interface for specifying input information identifying the configuration file, and output information identifying an address for the extracted data. The extracted data is received using the address specified in the output information.

In a second aspect, a server comprises at least one processor and a memory, and the processor can execute instructions stored in the memory. Execution of the instructions can cause the processor to run a configuration generator tool that generates a configuration file associated with a module of a software system. The configuration file can be generated for use in extracting data from the module in the software system according to a specification in the configuration file. The configuration generator tool can provide the configuration file to a customer system using a determined module identity. Execution of the instructions can cause the processor to run a test data organizing tool that receives extracted data from the customer system in response to the configuration file being provided. The extracted data can correspond to the specification and may have been extracted from the customer system using the configuration file. Testing relating to the functionality of the customer system can be performed on at least some of the received extracted data. The server can associate a result of the testing with the customer system using the module identity.

Implementations can include any or all of the following features. The server can further comprise an incident reporting system to receive an incident report generated using the customer system. The incident report can indicate an incident relating to the functionality. The module identity can be determined using the incident report. The server can further comprise a development system. The test data organizing tool can identify, using at least the module identity, the development system for performing the testing, and provide the received extracted data to the identified development system. The server can further comprise an interface that is designed to receive input in the configuration generator tool. The configuration file can be generated based on the input, and the interface can identify data objects for a user to select at least one data object identifier for inclusion in the configuration file. The interface can include a control for causing the selected data object in the received extracted data to be anonymized before the testing is performed. The server can further comprise a data extraction tool provided to the customer system. The data extraction tool can comprise an interface for specifying input information identifying the configuration file, and output information identifying an address for the extracted data. The extracted data can be received using the address specified in the output information.

In a third aspect, a method can comprise generating a configuration file associated with a module of a software system. The configuration file can be generated for use in extracting data from the module in the software system according to a specification in the configuration file. The method can comprise determining a module identity associated with a customer system. The module identity can be determined based on a need to perform testing related to functionality of the customer system. The method can comprise providing the configuration file to the customer system using the module identity. The method can comprise receiving extracted data from the customer system in response to providing the configuration file, the extracted data corresponding to the specification and having been extracted from the customer system using the configuration file. The method can comprise performing the testing relating to the functionality of the customer system, the testing performed on at least some of the received extracted data. The method can comprise associating a result of the testing with the customer system using the module identity.

Implementations can include any or all of the following features. The method can further comprise receiving an incident report generated using the customer system, the incident report indicating an incident relating to the functionality. The module identity can be determined using the incident report. The method can further comprise identifying a development system for performing the testing, the development system identified using at least the module identity, and providing the received extracted data to the identified development system. Performing the testing can result in development of software for the software system, and the method can further comprise providing the developed software to the customer device in response to receiving the extracted data. The method can further comprise running a configuration generator tool comprising an interface that is designed to receive input. The configuration file can be generated based on the input, and the interface can identify data objects for a user to select at least one data object identifier for inclusion in the configuration file. The interface can include a control for causing the selected data object in the received extracted data to be anonymized before the testing is performed.

The details of one or more implementations are set forth in the accompa-nying drawings and the description below. Other features will be apparent from the description and drawings, and from the claims.

BRIEF DESCRIPTION OF THE DRAWINGS

FIG. 4 shows an example of a specification that can be generated in a configuration generator tool for inclusion in a configuration file.

FIG. 5 shows an example of a configuration file.

FIG. 6 shows an example of a test data extractor tool.

FIG. 7 shows an example of field selection for a test data extractor tool.

FIG. 8 shows an example of extracted data generated using a test data extraction tool.

FIG. 12 shows an example of a displayed test data container.

DETAILED DESCRIPTION

Figure 1:
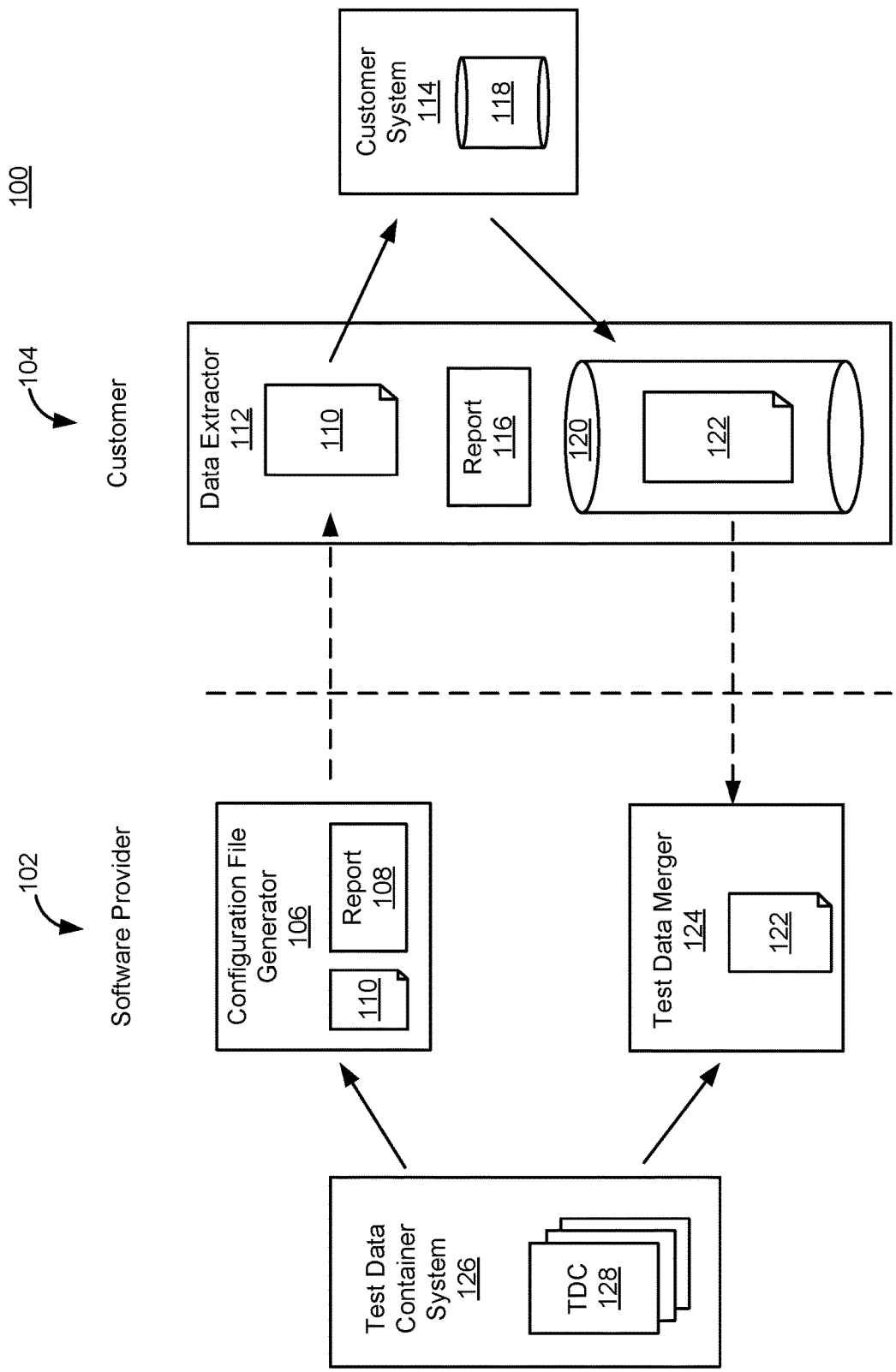
FIG. 1 shows an example of a system that can manage extraction of test data.

This document describes systems and techniques to facilitate use of real testing data in software development. In some implementations, a customer who operates a software system can be provided an automated way to contribute to a development team that is performing testing activities. For example, this can facilitate development of additional software for the customer's system. A test data management system can be configured to collect, manage and use real customer testing data in software development and maintenance processes. For example, this can be done in response to a customer reporting an incident (e.g., a software bug) to the company that developed the software system, and the testing data can then facilitate the development of additional software, such as in an attempt to fix the incident/bug.

Implementations can provide a technical solution to the situation that the bug or other issue is detected or observed in a customer system, whereas the developer's work in addressing the bug/issue should be performed in a developer system. Customer systems and developer systems are normally separate and independent from each other, and the developer therefore typically does not have access to the data in the customer system. Moreover, the customer may not have sufficient technical knowledge about the customer system and its data contents to be able to determine and/or provide the relevant data for testing. As such, the testing by the developer is usually performed on other data that did not originate in the customer system. This can lead to a situation where the newly developed code operates satisfactorily when run with the testing data, but not when installed on the customer system. Implementations can provide the advantage that newly developed software does not have this deficiency, because a developer has the ability to test the new code on the data where the issue arose.

As another example, when a software system has been provided to multiple clients, the developer(s) may have to perform testing relating to several customers, each of which may have reported a different issue. This gives rise to a need to ensure that the respective testing data for different customers remains identifiable with regard to where it originated and the testing to which it relates. Implementations can provide a technical solution to this situation by associating extracted data with one or more identifiers relating to the customer and/or the customer system.

Other technical advantages could include, but are not limited to, any or all of the following. The testing coverage by the company that provides the software can be increased. The time necessary to reproduce customer scenarios can be significantly reduced. Implementations can facilitate that more time is invested in addressing real system issues than analyzing those issues. Implementations can ensure that the quality of of software products is not affected (or is less affected) by maintenance activities. The response time for a customer can be decreased. Help the first levels of support in filtering discovered consulting issues, so that real bugs can be forwarded to development support faster.

FIG. 1 shows an example of a system 100 that can manage extraction of test data. Components of the system 100 are implemented using one or more computer systems. For example, one or more processors can execute instructions stored in a computer-readable medium (e.g., in memory). Execution of the instructions is done to perform certain functionality, for example to establish, maintain and operate the individual system components.

The system 100 can be schematically organized with at least one software provider side 102 and at least one customer side 104. The respective components of the system can communicate with each other using one or more networks. For example, multiple customers of the same software provider can operate within the customer side 104 and can individually engage in communication with at least one component in the software provider sider 102. With regard to the software provider, each customer on the customer side 104 can have a unique identity (e.g., in form of a specific customer ID). Moreover, a module of the software system operated by the customer can have an identity (e.g., in form of a module ID). In some implementations, the software provider side 102 is operated by a provider or enterprise resource planning (ERP) systems, such as, but not limited to a human resources (HR) information management system. For example, the customer system operating on the customer side 104 can be characterized as being particularly the HR module of the software system and being operated by a specific Customer.

The software provider side 102 includes a configuration file generator 106. The generator 106 can facilitate that extraction of data can be performed from a customer system so that the extracted data can be used in testing. In particular, a customer identity and a module identity can be used in coordinating the data extraction, subsequent testing of the extracted data, and delivery of additional software to the customer system. The identification and maintenance of the customer and module identities can be facilitated by the software provider side 102 of the system 100. In some implementations, the software provider side 102 can include or constitute at least part of a test data management system.

The configuration file generator 106 can provide an interface for a user to interact with at least part of the software provider side 102. The interface can include at least one report 108. In some implementations, the report 108 can be presented on a display and provide for user input of certain information and control of one or more settings for the generation of a configuration file. In some implementations, the report 108 can be used for defining that the test scenario needs certain data objects, tables and/or other data content. For example, a web-based screen can be provided that is configured regarding the particular input and output information.

A user can utilize the configuration file generator 106 to generate at least one configuration file 110. The configuration file 110 can be targeted to one or more particular modules of the software system installed on the customer side 104. As such, the configuration file 100 can be used for any customer using the module(s). The configuration file 100 can facilitate extraction of relevant data from such system(s) for purposes of providing testing data. This is done by including a specification in the configuration file 110, the specification defining for a data extractor component (e.g., as described below) what customer system data to collect during the extraction. In some implementations, the configuration file 110 includes markup language that provides such a specification in the file. For example, extensible markup language (XML) tags can be used to formulate the specification. The configuration file generator 106 can provide the developer with the technical advantage of being able to specify what data the customer system should extract and provide for testing.

The customer side 104 can include at least one data extractor component 112. The data extractor component 112 can serves, or provide, an extractor tool. For example, the data extractor component 112 can interact with the configuration file generator 106 on the software provider side 102, and with one or more customer system 114 on the customer side 104. The customer system 114 can operate any of various types of software system, including, but not limited to, an HR module of an ERP system. The data extractor component 112, then, can be used for extracting HR data and/or other ERP data from the customer system 114 so that the extracted data can be used for testing.

The data extractor component 112 can provide an interface for a user to interact with at least part of the customer side 104. The interface can include at least one report 116. In some implementations, the report 116 can be presented on a display and provide for user input of certain information and control of one or more settings of the data being extracted. For example, a web-based screen can be provided that is configured for the particular input and output information.

The data extractor component 112 extracts data from the customer system 114 in accordance with the specification of the configuration file 110. In some implementations, data can be extracted from one or more data stores 118 in the customer system 114. For example, the data store 118 can contain information in form of database tables, and/or in another form, that the customer system 114 creates and/or uses in performing the functions that are part of the installed software system.

The data extractor 112 can include one or more extraction data stores 120 where data extracted according to the configuration file 110 can be accumulated. In some implementations, the extracted data can be collected in one or more files 122 in the extraction data store 120. The contents of the file 122 can be articulated using markup language. For example, the file 122 can use the same markup language as the configuration file 110.

That is, the data extractor component 112 here operates within the customer side 104 and serves to generate the file(s) 122 of extracted data. In some implementations, the data extractor component 112 can be included in the customer system 114. For example, a component designed to obtain selections of database tables from the data store 118 can serve as the data extractor component 112. The data extractor component 112 uses the configuration file 110 to obtain the technical advantage that some or all of the relevant data in the customer system can be extracted in response to the customer reporting an issue with the system. This can provide the developer the technical advantage of being able to test newly developed code on the customer's actual data.

As will be exemplified further below, the data extracted from the customer system 114 and placed in the file 122 can include multiple categories of information and/or multiple data structures, in accordance with the specification formulated in the configuration file 110. Testing can then be performed on the entirety of the extracted data collectively, or the testing can be performed on one or more parts of the extracted data. To facilitate testing on partial extracted data, the software provider side 102 can include a test data merger component 124. The test data merger component 124 serves to organize and store the data of the file 122. The test data merger component 124 can do so by accepting the file 122 as an input parameter, and the extracted data of the file can then be separated into two or more units as applicable depending on the nature of the extracted data.

The software provider side 102 can include a test data container system 126. The test data container system 126 is configured to provide test data to a development system (not shown) so that the data can be used in testing. For example, software that is under development can be tested by running the software using testing data from one or more test data containers 128 created by the test data container system 126. The test data merger component 124, then, can identify which block(s) of data from the file 122 is associated with the respective test data containers 128, and can cause the identified block(s) to be placed in the corresponding test data container 128.

As such, the above are examples relating to a system that can be implemented by way of executing instructions stored in a non-transitory computer-readable storage medium. For example, the configuration file generator 106 can by way of the report 108 generate the configuration file 110 that is associated with a module of the software system of the customer system 114. Such a configuration file can be generated for use in extracting data from the module in the software system according to a specification in the configuration file. The examples illustrate that the software provider side 102 can determine a module identity associated with the customer system 114. The software provider side 102 does so because there is a need to perform testing related to functionality of the customer system 114. The software provider side 102 provides the configuration file 110 to the customer system 114 using the module identity, so that corresponding testing data can be extracted.

The examples illustrate that the software provider side 102 receives extracted data in the file 122 from the customer system 114 in response to providing the configuration file 110. The extracted data corresponding to the specification in the configuration file 110 and was extracted from the customer system 114 using the configuration file 110. The software provider side 102 can perform the testing relating to the functionality of the customer system 114, the testing being performed on at least some of the received extracted data. The software provider side 102 can associate a result of the testing with the customer system 114, using the customer identity and the module identity, for example by delivering newly developed software to the customer system 114 for installation.

Figure 2:
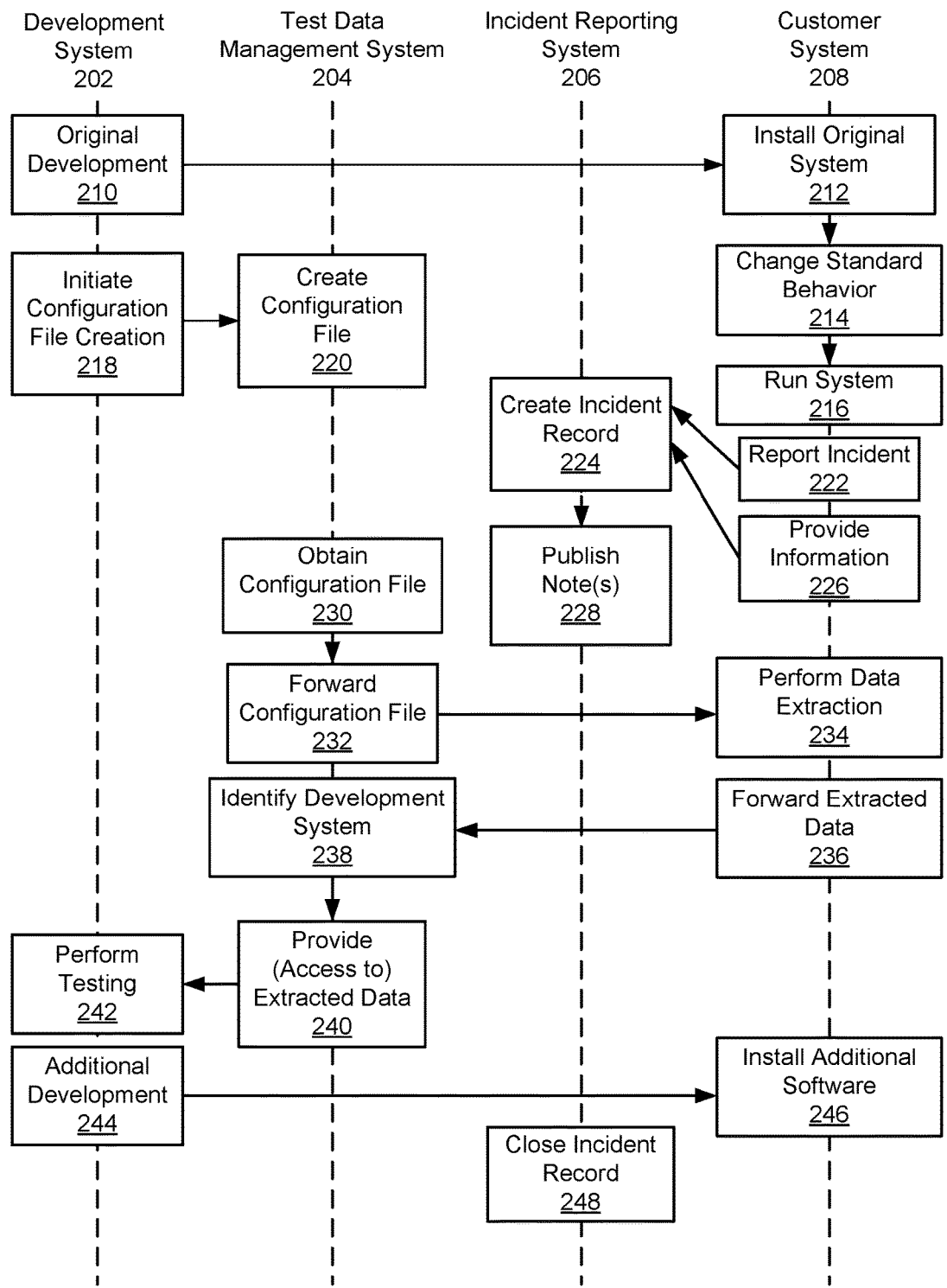
FIG. 2 shows an example of a sequence diagram relating to extraction of test data.

FIG. 2 shows an example of a sequence diagram 200 relating to extraction of test data. The sequence diagram 200 includes operations of, and interactions between, at least a development system 202, a test data management system 204, an incident reporting system 206 and a customer system 208 (e.g., customer system 114 in FIG. 1). The systems 202-208 can be, but are not necessarily, arranged according to a software provider side and a customer side as exemplified above.

At 210, original development of software can be performed in the development system 202. For example, one or more developers can use the development system 202 to write executable code for a new software system. As another example, the development at 210 can be done to improve on an earlier, existing software system. In any event, at 212 the original system so developed can be installed on the customer system 114. That is, the software system can be distributed from the development system 202 to the customer system 208 in form of software code and/or other executable structures, and the software system can thereafter be installed for operation. For example, this can be a new installation of a software system not previously installed on the customer system 208. As another example, this can be an installation of an update to a software system that had already been installed on the customer system 208.

The software system installed at 212 can be associated with one or more items of identity information. For example, the customer who operates the customer system 208 can have a unique customer identity with regard to the software provider, and the installation can have one or more module identities depending on what aspects of the overall software system (e.g., an ERP system) the customer chooses to install (e.g., an HR module).

At 214, the customer can modify the installation in one or more ways. In some implementations, the customer customizes the system to modify its functionality, and/or to add or remove certain operational features. For example, the software system as developed can be configured to exhibit a standard behavior, and the customer can change this standard behavior of the software system in one or more regards. At 216, the customer can run the software system on the customer system 208.

The customer can encounter a situation where the functionality and/or operation of the installed software system do not conform to the customer's expectation or to specified performance characteristics. This can require testing to be performed, for example to determine a cause of the exhibited behavior and to explore possible remedies to non-conformant behavior. As indicated above, the efficiency and reliability of testing can be improved by using actual data from the system that is the target of the testing. In preparation for collection of such data one can define the scope of data that should be extracted. At 218, the development system 202 can be used to initiate creation of a configuration file suitable for use in data extraction. At 220, the test data management system 204 can create the configuration file, for example in form of file with XML content articulating a specification of the data to be extracted. For example, the configuration file can identify categories of data objects to be extracted. As such, this illustrates using a configuration generator tool in the test data management system 204 (e.g., the configuration file generator component 106 in FIG. 1).

At 222, the customer can then make use of the incident reporting system 206 to report an incident with the software system, for example using a web-based application. At 224, the incident reporting system 206 can respond to this prompt from the customer by creating an incident record. The incident reporting system 206 may need certain information from the customer system 208 to process the incident report, including, but not limited to, an identity of the customer and an identity of the module(s) installed in the customer system 208. At 226, the customer system 208 provides all or part of such information to the incident reporting system 206. At 228, the incident reporting system 206 can publish one or more notes in response to the customer's incident. In some implementations, a correction note and/or a consulting note can be published. For example, the note(s) can be available for the customer(s) in the incident reporting system 206. Customers can search the notes, download the notes in their system, and apply the notes (e.g., with a correction note) or read the note (e.g., with a consulting note). For example, a customer can download a consulting note, read the instructions in the note, obtain the configuration file(s) associated with the note, and use the configuration file(s) as input for an extraction tool.

As such, the above is an example of the incident reporting system 206 receiving an incident report generated using the customer system 208, the incident report indicating an incident relating to the functionality of the software system, wherein the test data management system 204 determines the customer identity and the module identity using the incident report. The example also illustrates that the configuration file can be generated before receiving the incident report. In other examples, the configuration file can be generated after receiving the incident report, such as in response to receiving that information from the customer.

At 230, the test data management system can obtain the configuration file. In some implementations, the configuration file can be unique and prepared in advance, and available for all customers. For example, the customer system 208 can send a request for the configuration file when the customer is using a note generated by the incident reporting system 206. At 232, the test data management system 204 forwards the configuration file to the customer system 208, such as directly following the customer having filed the incident report, or at a later time. For example, the incident report (e.g., the determined customer identity and/or module identity) can be used to determine where to forward the file. At 234, the customer system 208 can use the configuration file to perform data extraction. Data corresponding to the specification of the configuration file can be extracted and stored in one or more files. At 236, the customer system 208 can forward the extracted data in the file(s) to the test data management system 204.

The extracted data needs to be made available to the correct developer or team of developers, so that the reported behavior can be investigated and, if necessary, the correct software fix can be created. At 238, the test data management system 204 can perform such identification. In some implementations, the customer identity and/or the module identity associated with the received extracted data can be used to identify the development system(s) 202 as the correct one(s) among potentially many development systems that have been involved in the development of the entire software system. For example, based on the customer having installed a particular module (e.g., the HR module) out of those available for the entire software system, it can be determined that the developers responsible for the HR module are the proper team to handle the testing (and preparation of new software code, if applicable). Accordingly, the development system 202 associated with that team of developers is the appropriate system. At 240, the test data management system 204 can provide the development system 202 at least access to the extracted data. For example, the test data management system 204 can forward a link or other address of the extracted data to the development system 202 so that it can access the extracted data. As another example, the test data management system 204 can forward all or some of the extracted data to the development system 202. The extracted data can be contained in one or more files. For example, the file can include markup language code, such as of the same markup language as may have been used in the configuration file.

At 242, the development system 202 can perform testing on the extracted data. In some implementations, this is done while the extracted data is kept in a test data container or other suitable framework for managing the data so that it can be subjected to testing. For example, respective data objects of the extracted data may be organized into separate containers and testing can be performed separately and individually for them.

The testing can be associated with additional development at 244. For example, existing code can be executed in the context of the extracted data to allow developers to monitor system behavior and correlate that with the observations reported by the customer. As another example, new code can be written to address an identified system behavior, and this new code can then be executed using the extracted data, so as to test the code in the presence of relevant data. When additional software has been developed, it can be provided to the customer system 208 at 246, and installed there. For example, the customer identity and/or the module identity can be used to facilitate that the code is provided to and installed on the correct system. Thus, the customer system 208 can receive additional software that has been developed with the benefit of testing performed using data extracted from the customer's own system.

Figure 3:
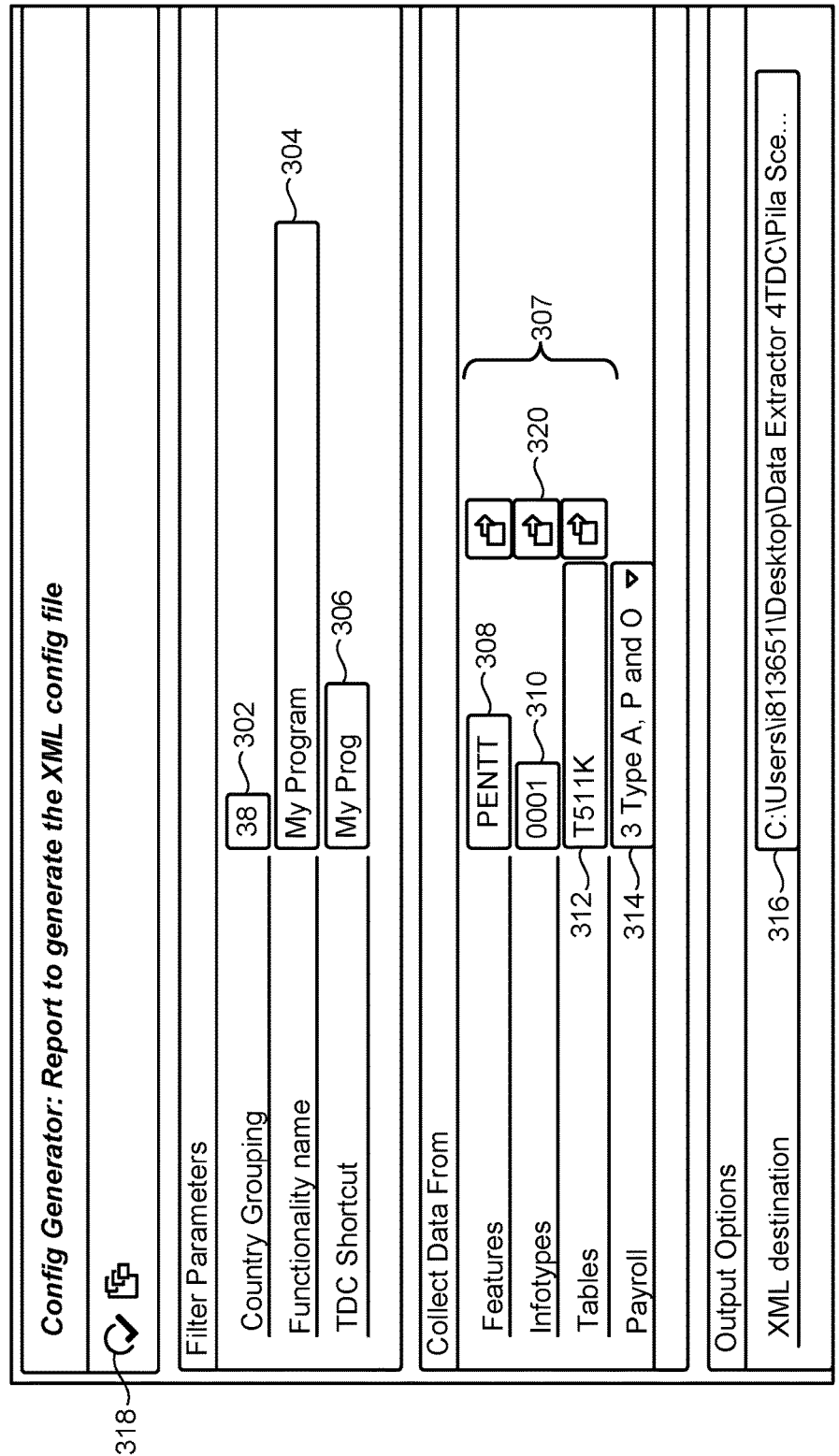
FIG. 3 shows an example of a configuration generator tool.

FIG. 3 shows an example of a configuration generator tool 300. The configuration generator tool 300 provides an interface for creating a configuration file. This can provide the developer the technical advantage of being able to ensure that the correct and complete data needed for testing is extracted from the customer system. The configuration generator tool 300 can be implemented in form of a report that is run in a development system (e.g., the development system 202 in FIG. 2). The user can enter information in one or more input fields of the configuration generator tool 300, and the system can then use the entered information, optionally together with code or other data, to generate a configuration file suitable for use in extracting data from a customer system. That is, the entered information can, at least in part, serve as a basis for a specification in the configuration file to be generated.

The configuration generator tool 300 can include a country grouping field 302. The field 302 can be used for entering a code or other name of a country or other geographical region. For example, the field 302 can receive the code/name of the region where the specific customer system is being operated (e.g., the region for which the customer system may have been specifically customized).

The configuration generator tool 300 can include a functionality name field 304. The field 304 can be used for entering a code or other name of a functionality related to the aspect of the customer system that is to be tested. For example, this can relate to the particular module(s) that the customer has installed on the system. Here, "My Program" is entered in the field 304.

The configuration generator tool 300 can include a test data container (TDC) shortcut name field 306. The field 306 can be used for entering a code or other name to serve as a shortcut way of identifying and/or accessing the TDC of the test data to be extracted. Here, "MYPROG" is entered in the field 306.

The configuration generator tool 300 can include an area 307 for specifying one or more data objects to be the subject of the data extraction. The area 307 can include one or more fields and/or other forms of information input. Here, a features field 308 can be used for specifying one or more features of the installed module(s) on the customer system. An infotypes field 310 can be used for specifying one or more codes or other names representing infotypes (i.e., a type of data object). A tables field 312 can be used for identifying or otherwise specifying one or more tables of a database to be subject to data extraction. A payroll field 314 can be used to specify (e.g., for an HR module that administers payroll and generates separate payroll records in doing so), one or more payroll records to be subject to data extraction. That is, the configuration generator tool 300 identifies data objects for a user, so that the user can select at least one data object identifier for inclusion in the configuration file. More or fewer fields than shown in this example can be used.

The configuration generator tool 300 can allow the user to specify output options for the extracted data. Here, an XML destination field 316 can be used for specifying a destination for the configuration file to be generated. For example, an address can be entered. This address can be an address local to the system that operates that configuration file generator, to name just one example.

An execution control 318 in the configuration generator tool 300 can be used to trigger creation of the configuration field. The information entered in the configuration generator tool 300 can then be used to assemble the configuration file according to the user's specification. The generated file can then be stored at the destination specified using the field 316.

For one or more fields in the configuration generator tool 300, the user can choose to make a selection using an additional presented interface. For example, a control 320 is here associated with the infotypes field 310. Accordingly, by activating the control 320 the user can cause a new area to be presented for assistance in specifying the infotype(s) to be included in the extracted data according to the configuration field to be generated.

FIG. 4 shows an example of a specification 400 that can be generated in a configuration generator tool for inclusion in a configuration file. In some implementations, the specification 400 can be generated in association with the configuration generator tool 300 (FIG. 3). For example, the specification 400 can be presented in response to user selection of the control 320 (FIG. 3). The specification 400 contains an objects area 402, a description area 404, an anonymize control area 406 and a conditions entry area 408. Here, an object 410 labelled "PAYROLL C0" appears among other objects in the object area 402, and multiple sub-objects 412 of that object 410 are shown. For example, one of the sub-objects 412 is labelled "KSTNN". For example, the sub-object 412 can correspond to a "Cost Center" according to the description field 404.

That is, the specification 400 allows the user to select what data object(s) and/or sub-object(s) thereof should be included in the specification of the configuration file. When certain categories or types of information are to be included in the testing data, it may be preferable or necessary to anonymize such data. For example, this can ensure that privacy regulation or other privacy constraints (including, but not limited to, a privacy policy) are complied with. For example, the sub-object can have a control 414 for causing that information (i.e., the name of a cost center) to be anonymized. In some implementations, the anonymization is done after or during the extraction of data, and before the data is provided to the development system for testing. As such, it can be ensured that confidential, private or other sensitive information is not shared outside the scope of the customer system. In some implementations, the anonymization can be accomplished by replacing the actual data in the object(s) with replacement data of the same type. For example, a cost center name can be replaced with a fictitious cost center name. A another example, a person's real first name can be replaced with another first name. In some implementations, anonymization can be accomplished by replacing the actual data in the object(s) with random replacement data. For example, a cost center name can be replaced with an arbitrary set of characters. Other ways of anonymization can be used.

The conditions field 408 can be used for specifying one or more conditions for the inclusion of a particular data (sub-) object in the extracted data. For example, the conditions field can receive input signifying a logical test for inclusion (or exclusion) of that particular data from the file of the testing data.

FIG. 5 shows an example of a configuration file 500. The file 500 can be formulated using a markup language, for example XML. The file 500 includes a data portion 502 that contains the specification for data extraction. For example, this can result from setting(s) made in the configuration file generator 300 (FIG. 3). In the data portion 502, a functionality portion 504 can specify one or more functionalities for which data should be extracted. A TDC portion 506 can specify the target TDC for the data extraction. A payroll portion 508 can specify whether, and what specific, payroll data should be extracted. In some implementations, an infotype portion (not shown) in the configuration file 500 can specify whether, and what specific, infotype object data should be extracted. In some implementations, a features portion (not shown) in the configuration file 500 can specify whether, and what specific, features data should be extracted. The portions 502-508 can be expanded or contracted as needed to show more or less of the underlying specifications of each portion of the specification.

FIG. 6 shows an example of a test data extractor tool 600. The test data extractor tool 600 can be used in a customer system, for example to extract testing data therefrom. The test data extractor tool 600 can be implemented in form of a report executed in a system that manages database information. The test data extractor tool 600 can include an area 602 for limiting the data extraction in terms of the date(s) of the data to be extracted. The test data extractor tool 600 can include a personnel area 604 for limiting the data extraction in terms of the specific person(s) about whom data is to be extracted. The test data extractor tool 600 can include an area 606 for specifying input and output information regarding the data extraction. A field 608 can specify input information for the data extraction. For example, an address of the configuration file can be specified. A field 610 can specify output information for the data extraction. For example, a destination address for the file of extracted data can be specified. A control 612 can be used for triggering the data extraction by the customer system.

FIG. 7 shows an example of field selection for a test data extractor tool. Here, an area 700 allows a user to make a field selection using one or more of an objects area 702, a description area 704, an anonymize area 706 and a conditions area 708. For example, the selection can specify a particular object 710 (e.g., an infotype) and/or a specific sub-object 712). The field selection can determine how the test data extractor tool performs the data extraction. In some implementations, a customer will not be able to uncheck any necessary fields for testing. For example, the customer may only be able to define that one or more fields needs to be anonymized. As another example, the conditions area 708 may not be available for a customer during the extraction process.

FIG. 8 shows an example of extracted data 800 generated using a test data extraction tool. In some implementations, the extracted data 800 can be in form of a file containing markup language, such as an XML file. A portion 802 can indicate a specific infotype object from which data has been extracted. A portion 804 can indicate a specific personnel number to which the extracted data relates. A portion 806 can indicate a start and end data for which data has been extracted. Other portion of the extracted data 800 can then include the actual data that was extracted according to the applicable specifications.

Figure 9:
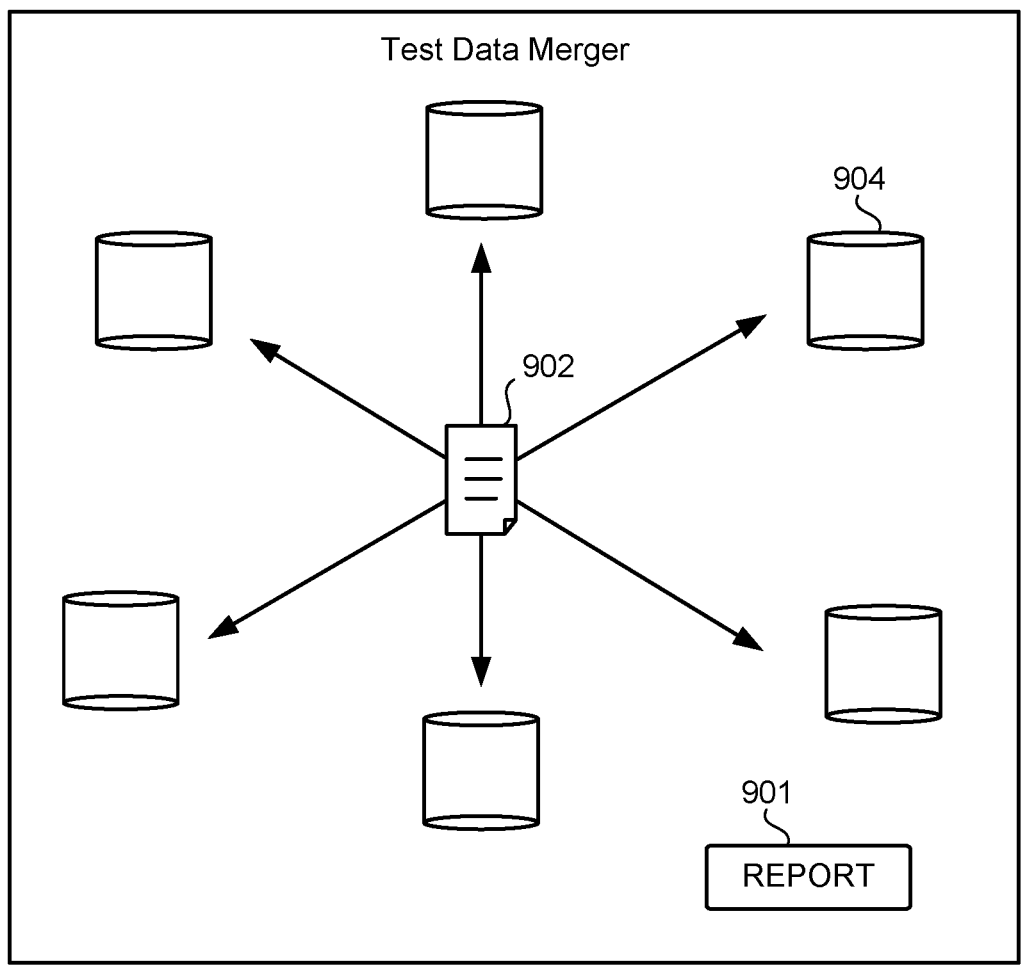
FIG. 9 shows an example of a test data merger system.

FIG. 9 shows an example of a test data merger system 900. The test data merger system 900 can be implemented in form of a report 901. The test data merger system 900 can receive as an input a file 902 of extracted data from the customer system. For example, the test data merger system 900 can operate in a software provider system to which the extracted data is provided. Based on the categories of data included in the file 902, the data therein can be distributed to some or all of multiple storages 904. In some implementations, one or more of the storages 904 can be a TDC. For example, separate TDCs can be provided for respective data categories of payroll data, scenario data, features data, infotypes data, tables data and/or results data. As such, the test data merger system 900 can serve as a test data organizing tool that receives extracted data from the customer system in response to the configuration file being provided. As noted above, such extracted data can correspond to the specification and may have been extracted from the customer system using the configuration file.

Figure 10:
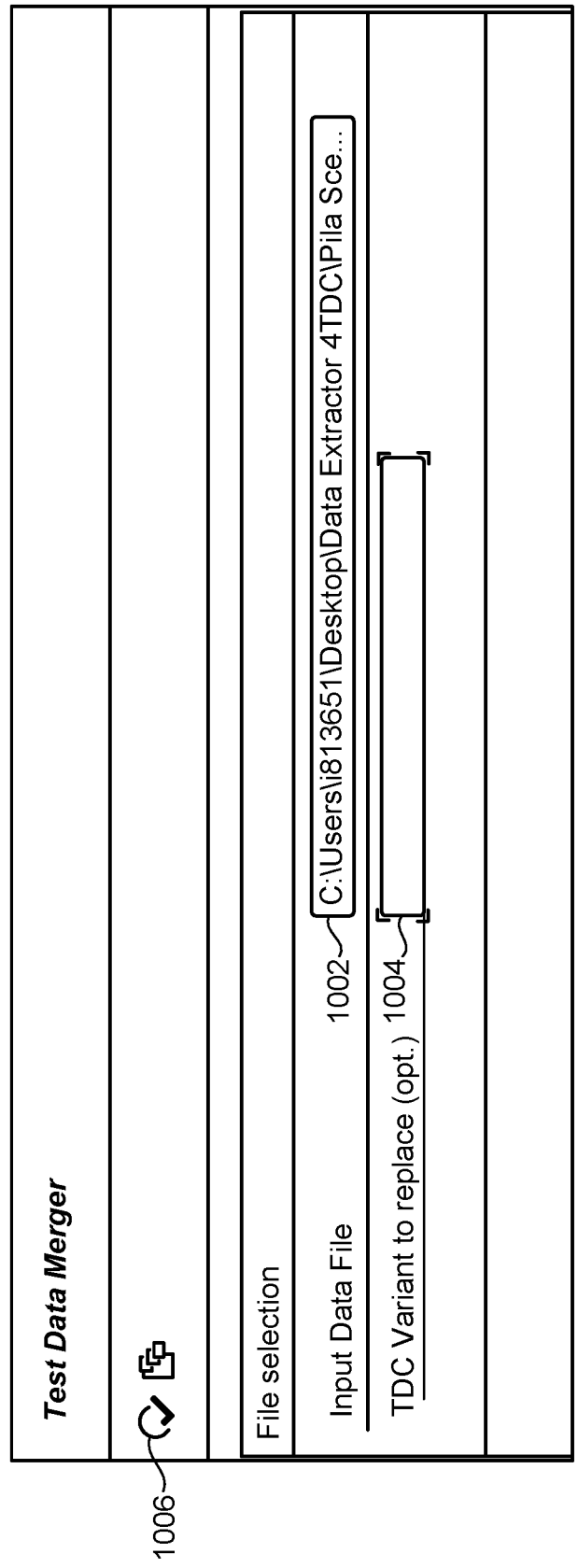
FIG. 10 shows an example of a single step test data merger tool.

FIG. 10 shows an example of a single step test data merger tool 1000. The test data merger tool 1000 can include an input data file field 1002 that can be used for specifying the file of extracted data to be used in the merger. For example, an address of an XML, file can be specified. The test data merger tool 1000 can include a TDC variant to replace field 1004. For example, the field 1004 can be used to specify that a particular TDC variant should be replaced.

Figure 11:
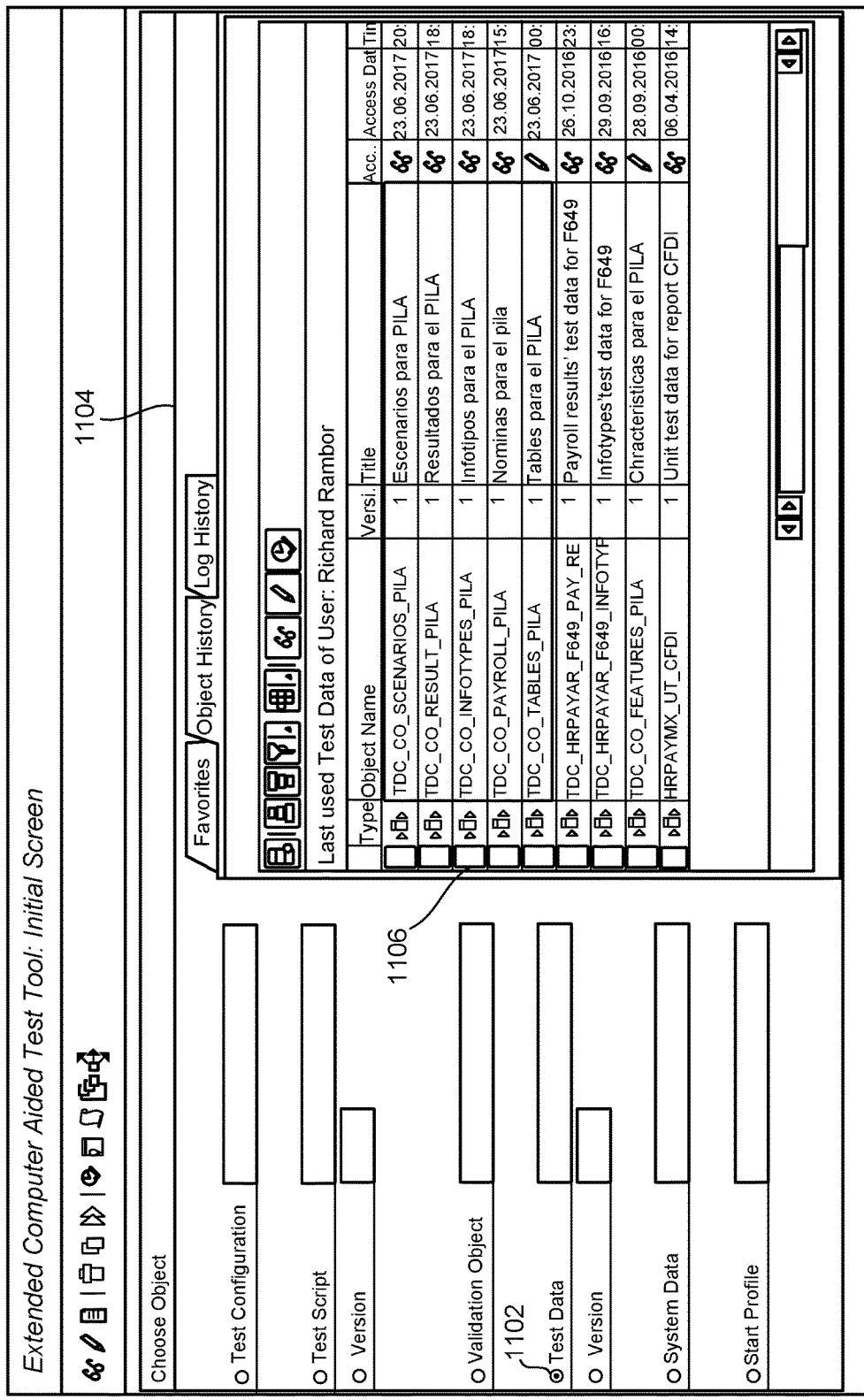
FIG. 11 shows an example of a test data container workbench.

FIG. 11 shows an example of a test data container workbench 1100. The workbench 1100 can be operated by a developer. For example, the workbench 1100 can allow the developer(s) to select what extracted testing data (e.g., what TDC) to use in a testing session in response to an incident reported by a customer. As indicated above, the extraction, management and ultimately use of the testing data can be facilitated by one or more determined identities, such as a customer identity and/or a module identity.

A portion of the workbench 1100 allows the developer to specify parameters for the testing. For example, a control 1102 can be used for specifying that the developer wishes to access certain test data with the workbench 1100. A portion 1104 of the workbench 1100, moreover, allows the developer to choose between available sources of extracted testing data. For example, one or more TDCs can be chosen. Such TDC(s) may have resulted from the merging exemplified above with reference to FIG. 9. For example, an object 1106 is here named TDC-CO-INFOTYPES_PILA and corresponds to infotypes.

FIG. 12 shows an example of a displayed test data container 1200. For example, the TDC may be displayed in response to input made in a workbench (e.g., FIG. 11). A field 1202 can indicate a name for the TDC. A field 1204 can indicate an address for the TDC. One or more areas 1206 can contain extracted data that is part of the TDC. In some implementations, the data can be organized according to one or more data objects. For example, the area 1206 can contain data corresponding to a particular infotype object. Accordingly, the container 1200 can allow the developer to run testing on data extracted from the system of a particular customer whose reported system issue the developer is tasked with investigating and for which new code might be developed.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:

generating a configuration file associated with a module of a software system, the configuration file generated for use in extracting data from the module in the software system according to a specification in the configuration file;

determining a module identity associated with a customer system, the module identity determined based on a need to perform testing related to functionality of the customer system;

providing the configuration file to the customer system using the customer identity and the module identity;

receiving extracted data from the customer system in response to providing the configuration file, the extracted data corresponding to the specification and having been extracted from the customer system using the configuration file;

performing the testing relating to the functionality of the customer system, the testing performed on at least some of the received extracted data;

associating a result of the testing with the customer system using the module identity; and providing a configuration generator tool comprising an interface that is designed to receive input, wherein the configuration file is generated based on the input, the interface identifying data objects for a user to select at least one data object identifier for inclusion in the configuration file, the interface including a control for causing the selected data object in the received extracted data to be anonymized before the testing is performed.

2. The method of claim 1, further comprising receiving an incident report generated using the customer system, the incident report indicating an incident relating to the functionality, wherein the module identity is determined using the incident report.

3. The method of claim 1, further comprising identifying a development system for performing the testing, the development system identified using at least the module identity, and providing the received extracted data to the identified development system.

4. The method of claim 1, wherein performing the testing results in development of software for the software system, further comprising providing the developed software to the customer device in response to receiving the extracted data.

5. The method of claim 1, wherein the received extracted data is associated with a test data container, and the testing is performed via the test data container.

6. A computer program product, the computer program product being tangibly embodied on a non-transitory computer-readable storage medium and comprising instructions that, when executed, are configured to cause at least one computing device to:

generate a configuration file associated with a module of a software system, the configuration file generated for use in extracting data from the module in the software system according to a specification in the configuration file;

run a configuration generator tool comprising an interface that is designed to receive input, wherein the configuration file is generated based on the input, the interface identifying data objects for a user to select at least one data object identifier for inclusion in the configuration file, the interface including a control for causing the selected data object in the received extracted data to be anonymized before the testing is performed;

determine a module identity associated with a customer system, the module identity determined based on a need to perform testing related to functionality of the customer system;

provide the configuration file to the customer system using the module identity;

receive extracted data from the customer system in response to providing the configuration file, the extracted data corresponding to the specification and having been extracted from the customer system using the configuration file;

perform the testing relating to the functionality of the customer system, the testing performed on at least some of the received extracted data; and associate a result of the testing with the customer system using the module identity.

7. The computer program product of claim 6, further comprising instructions to cause at least one computing device to receive an incident report generated using the customer system, the incident report indicating an incident relating to the functionality, wherein the module identity is determined using the incident report.

8. The computer program product of claim 7, further comprising instructions to cause at least one computing device to identify a development system for performing the testing, the development system identified using at least the module identity, and provide the received extracted data to the identified development system.

9. The computer program product of claim 7, wherein the configuration file is generated before receiving the incident report, and wherein the configuration file is provided to the customer system in response to receiving the incident report.

10. The computer program product of claim 6, wherein performing the testing results in development of software for the software system, further comprising instructions to cause at least one computing device to provide the developed software to the customer device in response to receiving the extracted data.

11. The computer program product of claim 6, wherein the specification in the configuration file identifies categories of data objects to be extracted using the configuration file, further comprising instructions to cause at least one computing device to organize and store the received extracted data according to the categories.

12. The computer program product of claim 6, wherein contents of the configuration file are expressed using markup language.

13. The computer program product of claim 12, wherein the extracted data is received as a file, and wherein contents of the file are expressed using the markup language.

14. The computer program product of claim 6, further comprising instructions to cause at least one computing device to provide a data extraction tool to the customer system, the data extraction tool comprising an interface for specifying input information identifying the configuration file, and output information identifying an address for the extracted data, wherein the extracted data is received using the address specified in the output information.

15. The computer program product of claim 6, wherein the received extracted data is associated with a test data container, and the testing is performed via the test data container.

16. A server comprising:

at least one processor and a memory, the processor executing instructions stored in the memory to run:

a configuration generator tool that generates a configuration file associated with a module of a software system, the configuration file generated for use in extracting data from the module in the software system according to a specification in the configuration file, wherein the configuration generator tool provides the configuration file to a customer system using a determined module identity;

an interface that is designed to receive input in the configuration generator tool, wherein the configuration file is generated based on the input, the interface identifying data objects for a user to select at least one data object identifier for inclusion in the configuration file, the interface including a control for causing the selected data object in the received extracted data to be anonymized before the testing is performed; and a test data organizing tool that receives extracted data from the customer system in response to the configuration file being provided, the extracted data corresponding to the specification and having been extracted from the customer system using the configuration file, wherein testing relating to the functionality of the customer system is performed on at least some of the received extracted data, and wherein the server associates a result of the testing with the customer system using the module identity.

17. The server of claim 16, further comprising an incident reporting system to receive an incident report generated using the customer system, the incident report indicating an incident relating to the functionality, wherein the module identity are determined using the incident report.

18. The server of claim 17, further comprising a development system, wherein the test data organizing tool identifies, using at least the module identity, the development system for performing the testing, and provides the received extracted data to the identified development system.

19. The server of claim 16, further comprising a data extraction tool provided to the customer system, the data extraction tool comprising an interface for specifying input information identifying the configuration file, and output information identifying an address for the extracted data, wherein the extracted data is received using the address specified in the output information.

20. The server of claim 16, wherein the received extracted data is associated with a test data container, and the testing is performed via the test data container.

* * * * *